United States Patent
Warta (10) Patent No.: US 12,083,749 B2
(45) Date of Patent: Sep. 10, 2024

(54) METHOD OF PRODUCING MOTOR VEHICLES AND TOOL SUITABLE THEREFOR

(71) Applicant: PPG Advanced Surface Technologies, LLC, Columbus, OH (US)

(72) Inventor: Helge Warta, Ditzingen (DE)

(73) Assignee: PPG Advanced Surface Technologies, LLC, Columbus, OH (US)

( * ) Notice: Subject to any disclaimer, the term of this patent is extended or adjusted under 35 U.S.C. 154(b) by 41 days.

(21) Appl. No.: 17/423,141

(22) PCT Filed: Dec. 19, 2019

(86) PCT No.: PCT/EP2019/086500
§ 371 (c)(1),
(2) Date: Jul. 15, 2021

(87) PCT Pub. No.: WO2020/148070
PCT Pub. Date: Jul. 23, 2020

(65) Prior Publication Data
US 2022/0134680 A1    May 5, 2022

(30) Foreign Application Priority Data

Jan. 17, 2019   (DE) .................... 10 2019 200 604.3

(51) Int. Cl.
*B29C 65/00*    (2006.01)
*B29C 65/50*    (2006.01)
*B29L 31/30*    (2006.01)

(52) U.S. Cl.
CPC .......... *B29C 65/5092* (2013.01); *B29C 66/02* (2013.01); *B29C 66/82661* (2013.01);
(Continued)

(58) Field of Classification Search
CPC .......... B29C 65/5092; B29C 65/81264; B29C 65/81457; B29C 65/82423; B29C 65/82661
See application file for complete search history.

(56) References Cited

U.S. PATENT DOCUMENTS 4,863,667 A * 9/1989 Martelli .............. B29C 63/0056
156/286
6,197,397 B1   3/2001 Sher et al.
(Continued)

FOREIGN PATENT DOCUMENTS

CN     108297123 A    7/2018
DE     42 33 622 A1   4/1994
(Continued)

OTHER PUBLICATIONS

First Office Action dated Nov. 2, 2022, of counterpart Chinese Patent Application No. 201980094313.9, along with an English translation.
(Continued)

*Primary Examiner* — Philip C Tucker
*Assistant Examiner* — Nickolas R Harm (57) ABSTRACT

A method of producing vehicles includes coating a vehicle body with paint, drying the paint, mounting attachment parts on load-bearing components of the vehicle body that has been coated with the paint that has been dried, and applying an adhesive film including an adhesive layer to a surface of the vehicle body that has been coated with the paint that has been dried or at least one attachment part mounted thereon, wherein, to apply the adhesive film, the adhesive film is positioned between the surface and an elastic membrane with an automated system, and the elastic membrane is transformed in selected regions into a curved state with a convex and a concave side and is brought into contact with the surface with the convex side in front such that the
(Continued)

adhesive layer of the adhesive film is pressed onto the surface by the membrane over the entire surface area.

10 Claims, 3 Drawing Sheets

(52) U.S. Cl.
CPC .. *B29C 66/81264* (2013.01); *B29C 66/81457* (2013.01); *B29C 66/82423* (2013.01); *B29L 2031/30* (2013.01)

(56) References Cited

U.S. PATENT DOCUMENTS

| | | |
|---|---|---|
| 6,199,613 B1 | 3/2001 | Petillon |
| 10,882,299 B2 | 1/2021 | Hotz et al. |
| 2015/0352822 A1 | 12/2015 | Niebling et al. |
| 2016/0144656 A1* | 5/2016 | Yoshimoto ................ B44C 1/10 156/285 |
| 2018/0264872 A1* | 9/2018 | Yamahiro ................ B44C 5/00 |

FOREIGN PATENT DOCUMENTS

| | | |
|---|---|---|
| DE | 198 12 402 A1 | 9/1999 |
| DE | 10 2010 021 892 A1 | 12/2011 |
| DE | 10 2013 000 400 A1 | 7/2014 |
| DE | 10 2017 208 038 A1 | 11/2018 |

OTHER PUBLICATIONS

First Search dated Oct. 19, 2022, of counterpart Chinese Patent Application No. 201980094313.9.

* cited by examiner

METHOD OF PRODUCING MOTOR VEHICLES AND TOOL SUITABLE THEREFOR

TECHNICAL FIELD

This disclosure relates to a method of producing motor vehicles, in which an adhesive film is applied to a surface of a motor vehicle body, as well as a tool suitable for this purpose.

BACKGROUND

Adhesive films are increasingly being used in the series production of motor vehicles. They can be used both decoratively, for example, to transfer a color pattern to a body surface and functionally, for example, as protection for painted surfaces against stone chips or for applying inscriptions, model designations and the like.

The effort involved in applying a color pattern by an adhesive film is generally significantly less than in creating such patterns in a multi-stage painting process. However, application of adhesive films in series production is anything but trivial. The larger the adhesive film is, the more difficult it is to position it correctly on the surface to be provided with adhesive and adhesively bond it without air pockets and formation of folds. Automation of these processes has up to now not been successful. Rather, application of adhesive films in the series production of motor vehicles has so far been carried out manually.

U.S. Pat. No. 6,197,397 B1 discloses adhesive films comprising microstructured channels within the adhesive layer. Those channels are intended to allow air to escape when the adhesive films are applied to avoid air pockets and make manual reworking to remove them superfluous. On the one hand, however, such adhesive films are very expensive. On the other hand, owing to the microstructured adhesive layer, they are less suitable for the formation of high-quality surfaces. Adhesive films generally comprise a carrier film, one side of which is covered with an adhesive layer and the other side of which is covered with an optionally multilayered paint layer. When using very thin carrier films, the microstructure still leaves visible traces behind, even after being adhesively bonded on. The use of particularly thick adhesive films is fundamentally not desired. The problem can indeed be solved with thick films. However, these lie heavily on the substrate. If a clear paint is not painted over it, the results are also not satisfactory.

It could therefore be helpful to provide an automated method and tool that applies adhesive films and integrates them into a series production of motor vehicles, in particular a production line provided for this purpose.

SUMMARY

I provide a method of producing motor vehicles including: a. coating a motor vehicle body with at least one paint; b. drying and/or hardening the at least one paint; c. mounting attachment parts on load-bearing components of the motor vehicle body that has been coated with the at least one paint that has been dried and/or hardened; and d. applying an adhesive film including an adhesive layer to a surface of the motor vehicle body that has been coated with the at least one paint that has been dried and/or hardened or at least one attachment part mounted thereon, wherein, to apply the adhesive film, e. the adhesive film is positioned between the surface and an elastic membrane with an automated system, and f. the elastic membrane is transformed at least in selected regions into a curved state with a convex and a concave side and is brought into contact with the surface with the convex side in front such that the adhesive layer of the adhesive film is pressed onto the surface by the membrane over the entire surface area.

I also provide a tool that applies an adhesive film to a surface of a motor vehicle body that has been coated with at least one paint that has been dried and/or hardened or an attachment part mounted thereon, according to a method of producing motor vehicles including: a. coating a motor vehicle body with at least one paint; b. drying and/or hardening the at least one paint; c. mounting attachment parts on load-bearing components of the motor vehicle body that has been coated with the at least one paint that has been dried and/or hardened; and d. applying an adhesive film including an adhesive layer to a surface of the motor vehicle body that has been coated with the at least one paint that has been dried and/or hardened or at least one attachment part mounted thereon, wherein, to apply the adhesive film, e. the adhesive film is positioned between the surface and an elastic membrane with an automated system, and f. the elastic membrane is transformed at least in selected regions into a curved state with a convex and a concave side and is brought into contact with the surface with the convex side in front such that the adhesive layer of the adhesive film is pressed onto the surface by the membrane over the entire surface area, including: a. the elastic membrane; b. a means for fixing the adhesive film in a parallel alignment in relation to the membrane; a frame that forms, together with the surface to be provided with adhesive and the membrane, a negative-pressure chamber in which the adhesive film is arranged and into which the membrane can curve when the negative-pressure chamber is subjected to a negative pressure.

DETAILED DESCRIPTION

My method of producing motor vehicles always comprises:
  a. coating a motor vehicle body with at least one paint,
  b. drying and/or hardening the at least one paint,
  c. mounting attachment parts on load-bearing components of the motor vehicle body that has been coated with the at least one paint that has been dried and/or hardened, and
  d. applying an adhesive film comprising an adhesive layer to a surface of the motor vehicle body that has been coated with the at least one paint that has been dried and/or hardened or of one of attachment parts mounted thereon.

An application of clear paint is not provided after the application of the adhesive film.

The method is particularly distinguished in that, to apply the adhesive film, e. the adhesive film is positioned between the surface and an elastic membrane using an automated system, and     f. the elastic membrane is transformed at least in selected regions into a curved state with a convex and a concave side and is brought into contact with the surface with the convex side in front, with the result that the adhesive layer of the adhesive film is pressed onto the surface by the membrane over the entire surface area.

The use of the curved membrane is very crucial for the method. When contact is being made with the surface, the curvature results in the production of an initial punctiform contact region in which the adhesive layer of the adhesive film is pressed onto the surface since the highest point of the curvature presses the adhesive film onto the surface first. When the membrane is being brought closer to the surface or the curvature is intensified and, as a result of an increase in the contact pressure, the contact region then spreads out radially until the adhesive layer comes into contact with the surface over the entire surface area.

The term "attachment part" is to be interpreted broadly in the context of this disclosure. This includes, on the one hand, non-painted parts such as windows or headlights, but also, on the other hand, painted parts such as an engine hood, a door, a fender and a roof element or colored plastic parts. If appropriate, a paint was applied to such attachment parts separately from the motor vehicle body and dried and/or hardened.

In the method, the membrane and the adhesive film are preferably positioned over the surface to be provided with adhesive such that the initial contact region is formed in a central region of the adhesive film and the surface to be provided with adhesive such that the contact region spreads out from there in the direction of the edges of the adhesive film. This minimizes the risk of air pockets.

Such a procedure is virtually impossible in manual application of an adhesive film. To ensure correct positioning of the adhesive film on the surface, an edge of an adhesive film is manually always aligned and pressed on first.

The at least one paint is preferably a conventional multilayered automotive paint. Vehicle bodies and body parts are generally primed, painted with a base paint and then provided with a coat of clear paint. The work steps and intermediate steps required for this are known. For my methods, it is only important that the at least one paint on the substrate to be provided with adhesive is dried and hardened, that is to say offers a pressure-resistant surface and no longer contains any solvent.

A first, particularly preferred example of my method (variant A) is distinguished by the directly following additional steps a. and b.:

a. the elastic membrane is transformed at least in selected regions into the curved state with the convex and the concave side, and     b. the automated system brings the membrane up to the surface with the convex side in front until the adhesive layer of the adhesive film is pressed onto the surface by the membrane over the entire surface area.

In principle, in this example, a complete temporal overlap of the two steps a. and b. is possible. It is preferable, however, if step a. is concluded before step b., and it is further preferable if step b. is carried out only after step a. has concluded.

A second, particularly preferred example of my method (variant B) is distinguished by the directly following additional steps a. to c.:

a. the elastic membrane is brought up to the surface in one step by the automated system,     b. the membrane is transformed at least in selected regions into a curved state with a convex and a concave side, and     c. the curvature is intensified until the adhesive layer of the adhesive film is pressed onto the surface over the entire surface area by the convex side of the membrane.

In principle, in this example, a complete temporal overlap of the three steps is possible. It is preferable, however, if step a. is concluded before step b., and it is further preferable if steps b. and c. are carried out only after step a. has concluded.

Preferably, the adhesive film that can be used in the method is distinguished by at least one of the directly following features a. to h.:

a. the adhesive film comprises a carrier film having the adhesive layer on one side and a paint layer on the other side,     b. the carrier film is a plastic film, a metal film or a metal/plastic composite film,     c. the carrier film has a thickness of 10 μm to 120 μm,     d. the adhesive layer has a thickness of 10 μm to 80 μm, preferably of 30 μm to 60 μm,     e. the adhesive layer has a uniform thickness,     f. the adhesive layer consists of a homogeneous adhesive mass,     g. the adhesive layer has a surface area of 10 $cm^2$ to 8 $m^2$. and     h. the paint layer has a thickness of 20 μm to 150 μm, preferably of 30 μm to 90 μm, particularly preferably of 40 μm to 60 μm.

It is particularly preferred if at least the features a. and b. and g. directly above are realized in combination with one another. Preferably, the features a. to d. and g. and h., in particular a. to e. and g. and h., particularly preferably all the features a. to h. are realized in combination with one another.

The feature e. is particularly preferably realized in combination with the feature f A uniform thickness is to be understood as meaning that the adhesive layer is not weakened locally by microstructure channels for discharging air or other microstructures. The adhesive layer is preferably formed by depositing a homogeneous adhesive mass by a doctor blade and correspondingly has a substantially planar and uniform surface. "Homogeneous" means that the adhesive mass does not contain any particulates.

The use of microstructure-free adhesive layers allows adhesive films with very thin carriers to be used in my method and, nevertheless, a highly reflective "Class A surface" can be obtained in the process. Within the range of 10 μm to 120 μm specified above, carrier films with a thickness of 10 μm to 60 preferably of 10 μm to 40 μm, are therefore further preferred, at least if the adhesive layer is free of the microstructures mentioned.

Particularly preferably, my methods are distinguished by at least one of the directly following steps a. to c.:

a. to press the adhesive film on, a negative pressure is applied in the region between the surface to be provided with adhesive and the membrane,     b. the negative pressure is set to a value of ≤750 mbar, preferably to a pressure of 0.5 mbar to 750 mbar, and     c. the membrane is transformed into the curved state by the negative pressure or by the negative pressure.

It is particularly preferred if at least the steps a. and b. directly above are realized in combination with one another, if necessary all the steps a. to c.

This example relates in particular to the above-described variant B of my method.

Application of the negative pressure is advantageous in particular whenever the adhesive film is to be adhesively bonded to a surface of a structurally weak body component, for example, to a component composed of a very thin metal sheet that could be pressed in when the adhesive film is pressed onto the surface. The negative pressure is directed counter to the contact pressure and thus stabilizes the surface to be provided with adhesive. In return, the contact pressure can then be increased again.

A third, particularly preferred example of the method (variant C) is distinguished by the directly following additional steps a. to d.:
  a. in a first step, the elastic membrane is brought up to the surface by the automated system,
  b. in a second step, the negative pressure is applied in the region between the surface to be provided with adhesive and the membrane,
  c. in a third step, the membrane is transformed into the curved state with the convex and concave sides by the applied negative pressure, and
  d. the curvature is intensified by the negative pressure until the adhesive layer of the adhesive film is pressed onto the surface over the entire surface area by the convex side of the membrane.

In principle, in this example, temporally overlapping step a. with the rest of the steps is not possible. The steps b. and c. may fundamentally overlap. However, it is preferable if step b is concluded before step c. It is therefore preferable that the negative pressure is applied first and then the membrane is transformed into the curved state.

In the context of the above features a. and/or b. in the variants A, B and C of my methods, the terms "bringing up to" and "brought up to" should be interpreted very broadly. To bring the membrane up to the surface, in the simplest example, of course, the membrane may be moved toward the surface, but conversely the surface itself may also be moved toward the membrane. Only the distance between the surface and the membrane is of interest during the bringing up operation. For the purpose of reducing the distance, whether the membrane or the surface or both are moved is not crucial.

Further preferably, the membrane used in the method is distinguished by at least one of the directly following features a. to c.:
  a. the membrane consists of an elastic polymer material, in particular natural rubber or silicone,
  b. the membrane has a uniform thickness, and
  c. the membrane has weakening and/or reinforcing regions for the targeted influencing of the geometry of the curved state.

It is particularly preferred if either the features a. and c. or b. and c. directly above are realized in combination with one another.

It may be necessary to influence the geometry of the curved state of the membrane to form the punctiform contact region mentioned above. If, for instance, there is a depression in the surface to be provided with adhesive, the punctiform contact region must ideally be created at the deepest point of the depression. Formation of a circular contact region should be avoided since otherwise it is scarcely possible to prevent air pockets.

If, for example, the membrane is formed more thinly in one region than in another region, it will curve more easily and to a more pronounced extent in this region than in the rest of the regions when pressure or negative pressure is applied. The reverse applies in a reinforcement of the membrane.

Introduction of weakening and/or reinforcing regions into the membrane can furthermore be expedient to influence the expansion of the contact region. This can be advantageous in particular when adhesively bonding the adhesive film to curved surfaces, in particular to surfaces with depressions.

Particularly preferably, the method is distinguished by at least one of the directly following steps a. and b.:
  a. the membrane is transformed into the curved state by a positive pressure or by a positive pressure, and
  b. the membrane is heated or cooled before the adhesive film is pressed on.

Work may be carried out with the positive pressure as an alternative to the negative pressure described above. This is expedient in particular in variant A of my method. It is essential to the method that the curvature mentioned is created and how the curvature is formed is of secondary importance, wherein the stabilization mentioned of the surface to be provided with adhesive does not occur, of course, with the sole use of the positive pressure, but rather with the combined use of positive and negative pressure, which is also possible.

The membrane may be heated completely independently of the use of negative and positive pressure. By heating or cooling the membrane, for example, shrinkage or stretching effects can be counteracted.

A negative pressure applied between the surface to be provided with adhesive and the membrane may, as already indicated above, be varied in preferred examples to compensate for a contact pressure. Correspondingly, the method is distinguished in preferred examples by at least one of the directly following steps a. and b., preferably by a combination of the directly following steps a. and b.:
  a. the negative pressure is varied depending on the pressure that the membrane exerts via the adhesive film on the surface to be provided with adhesive, and
  b. if the pressure, exerted by the membrane, on the surface to be provided with adhesive increases, the negative pressure is increased.

For this purpose, an automated control and regulation mechanism may be provided which automatically adapts the negative pressure depending on the contact pressure. Preferably, in this example, the pressures can be detected by sensors.

Particularly preferably, the method is distinguished by at least one of the directly following steps a. to c.:
  a. the adhesive film is positioned between the surface and the elastic membrane by a mounting film to which the adhesive film adheres with its side that faces away from the adhesive layer,
  b. to position the adhesive film, the mounting film is fixed on or in a frame, and
  c. after the adhesive film has been pressed onto the surface, the mounting film is pulled off from the adhesive film.

It is particularly preferred if at least the steps a. and c. directly above are realized in combination with one another, particularly preferably all the steps a. to c.

Since the adhesive film, including its edges, is to be pressed onto the surface to be provided with adhesive, the mounting film facilitates positioning of the adhesive film.

After the adhesive film has been pressed on, the mounting film is preferably pulled off from the adhesive film.

The mounting film is preferably designed to be fixed on the frame. For this purpose, it may have positioning and fixing means that facilitate fixing on the frame.

The adhesive film is, for example, a decoration, an inscription or a single letter to be applied to the surface to be provided with adhesive.

It is possible to simultaneously transfer a plurality of adhesive films that adhere to the mounting film to the surface to be provided with adhesive, for example, if an inscription comprising a plurality of letters or words is to be transferred to the surface. In this example, it is preferred to position the membrane and the adhesive film over the surface to be provided with adhesive such that the initial contact region is formed in a central region of the inscription formed from a plurality of adhesive films.

My tool is used to apply the adhesive film described above to the painted surface of a motor vehicle body or an attachment part mounted thereon, which painted surface is likewise described above. The tool is suitable in particular for carrying out my methods. It is always distinguished by the following features:
  a. it comprises an example of the elastic membrane described above,
  b. it comprises a means for fixing the adhesive film in a parallel alignment in relation to the membrane, and
  c. it comprises a frame designed to form, together with the surface to be provided with adhesive and the membrane, a negative-pressure chamber in which the adhesive film is arranged and into which the membrane can curve when the negative-pressure chamber is subjected to a negative pressure.

As already described, it is particularly advantageous when applying the adhesive film to apply a negative pressure in the region between the surface to be provided with adhesive and the membrane. The frame is provided for this.

The membrane may have a double-walled form for temperature control purposes and have connections for a temperature control medium such as, for example, water.

Particularly preferably, the membrane has the weakening and/or reinforcing regions described above.

Since the adhesive film preferably adheres to the mounting film described above, the means for fixing the adhesive film is correspondingly preferably a means for fixing the mounting film.

The means for fixing the adhesive film or the mounting film may be, for example, pins that correspond to holes in the adhesive film or the mounting film.

Preferably, the tool is distinguished by at least one of the directly following features a. to f.
  a. the frame has a rectangular form,
  b. the frame has a first opening that is closed by the membrane,
  c. the frame comprises at least one elastic sealing element that can lie in a sealing manner against the surface,
  d. the frame comprises a second opening at the edges of which the at least one elastic sealing element is fixed,
  e. the frame comprises at least one connection for a negative-pressure source, via which the negative-pressure chamber can be subjected to negative pressure, and
  f. the frame comprises at least one attachment as a means for fixing the adhesive film.

It is preferred if at least the features a. to e. directly above are realized in combination with one another, particularly preferably all the features a. to f.

The at least one sealing element seals the negative-pressure chamber. They preferably consist of elastic polymer materials, for example, the natural rubber already mentioned. The at least one connection for the negative-pressure source is used to generate the negative pressure in the negative-pressure chamber.

Further preferably, the tool is distinguished by at least one of the directly following features a. to d.:
  a. the frame is composed of two or more sub-frames,
  b. the frame has a rectangular form and is composed of the two or more rectangular sub-frames,
  c. the frame comprises a first rectangular sub-frame on which the at least one elastic sealing element is fixed and comprises the at least one connection for the negative-pressure source, and
  d. the frame comprises a second rectangular sub-frame comprising the at least one attachment for the adhesive film.

It is preferred if at least the features a. to c. directly above are realized in combination with one another, particularly preferably all the features a. to d.

When using two or more sub-frames, it may be necessary to provide further sealing elements on connecting surfaces of the sub-frames to ensure the tightness of the negative-pressure chamber.

For the purpose of the above-described control of the negative pressure, the tool may have a suitable controlling and regulating device.

Further preferably, the tool is distinguished by at least one of the directly following features a. to c., preferably by a combination of the directly following features a. and b. or a. and c.:
  a. it comprises a pressure equalizing chamber that is delimited, inter alfa, by the membrane,
  b. it comprises a connection for a pressure source or a negative-pressure source that leads into the pressure equalizing chamber, and
  c. it comprises a valve via which the pressure equalizing chamber can be ventilated.

This pressure equalizing chamber is required, if appropriate, to create or intensify the described curvature of the membrane. If a negative pressure is applied in the negative-pressure chamber, it may be altogether sufficient for this purpose to ventilate the pressure equalizing chamber via the valve to bring about or intensify the required curvature of the membrane.

The tool is particularly preferably fixed on an automated system, for example, the arm of a robot. The tool, preferably including the automated system, is preferably arranged in a production line for the production of motor vehicles.

In principle, the described procedure and the described tool are not only suitable for use in the production of motor vehicles. Other series products may also be provided with adhesive films, for example, bicycles.

Further features and advantages will become apparent from the drawings described below, in which preferred examples of my tool are illustrated in different stages of my method. The illustrated and described examples are merely to explain and better understand my methods and tools and are in no way to be understood as restrictive.

Figure 1:
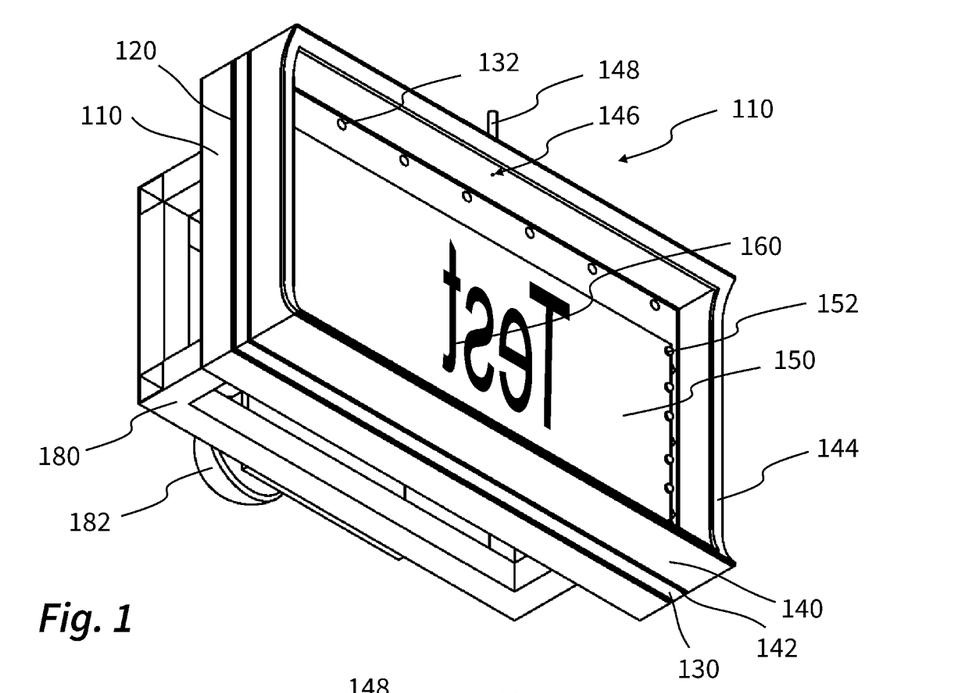
FIG. 1 schematically shows a plan view of the bottom side of a tool.
Figure 2:
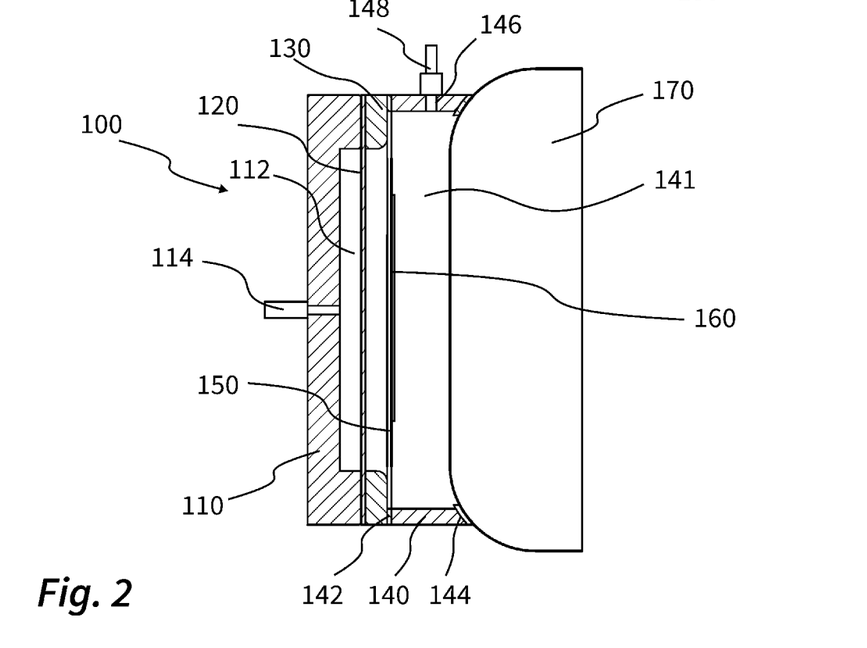
FIG. 2 schematically shows a partial illustration of a section through the tool illustrated in FIG. 1.

FIGS. 1 and 2 show a tool 100 suitable for applying adhesive films 160 to a painted surface 170 of a motor vehicle.

In this example, four separate adhesive films 160 in the form of four letters that together produce the word "test," adhere to the mounting film 150. Each of the adhesive films comprises a carrier film as well as a paint layer and an adhesive layer. In FIG. 1, the adhesive layer faces forward, while the letters adhere with the paint layer to the mounting film 150. The adhesive films 160 are intended to be transferred to the surface 170.

The tool comprises a rectangular frame composed of the rectangular sub-frame 130 and the rectangular sub-frame 140. The sub-frames 130 and 140 are connected in an airtight manner via the seal 142. The mounting film 150 is fixed to the sub-frame 130 by a plurality of pins 152 and has holes corresponding thereto into which the pins 152 are inserted.

The elastic membrane 120 composed of natural rubber is arranged parallel to the mounting film 150. The elastic membrane is clamped between the base plate 110 and a sub-frame 130 in an airtight manner. The elastic membrane closes the opening of the frame defined by the sub-frame 130. For this purpose, a plurality of screws 132 are screwed in the base plate 110 through the sub-frame 130.

The base plate 110 encloses the pressure equalizing chamber 112 with the membrane 120. Air can be admitted into the pressure equalizing chamber 112 via the valve 114.

A substructure 180 is attached to one side of the base plate 110 and has a receptacle 182 to connect the tool 100 to a lifting tool or a robot.

The frame consisting of the sub-frames 130 and 140 forms, together with the surface 170 to be provided with adhesive and the membrane 120, a negative-pressure chamber 141 in which the mounting film 150 including the adhesive films 160 is arranged and into which the membrane 120 can curve when the negative-pressure chamber 141 is subjected to a negative pressure. For this purpose, the negative-pressure frame 140 is adapted to the geometry of the surface 170, with the result that a form-fitting contact between the surface 170 and the negative-pressure frame 140 is ensured.

FIG. 2 illustrates how the sub-frame 140 lies against the surface 170. The elastic sealing element 144 is fixed at the edges of the opening of the frame defined by the sub-frame 140. The frame is connected in a sealing manner to the surface 170 via the elastic sealing element. The negative-pressure chamber 141 can be evacuated via the connection 148, which is coupled to a negative-pressure source, and the channel 146 which is guided through the sub-frame 140.

The membrane is not curved in FIGS. 1 and 2. This means that the same pressure prevails in the pressure equalizing chamber 112 and the negative-pressure chamber 141.

Figure 3:
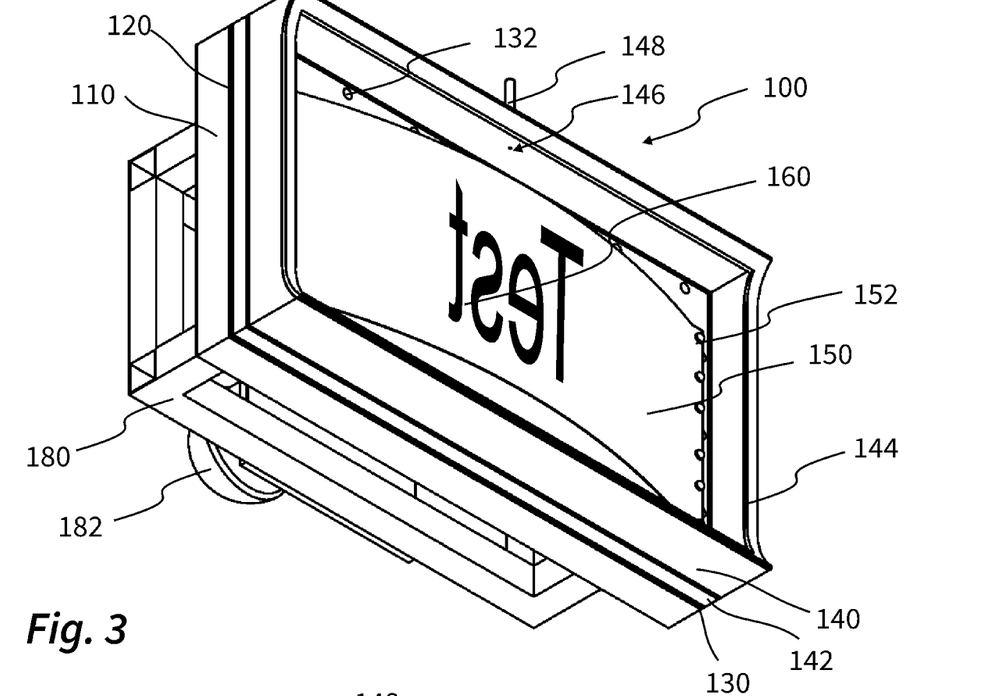
FIG. 3 schematically shows the tool illustrated in FIG. 1 in which a mounting film together with an adhesive is fixed.
Figure 4:
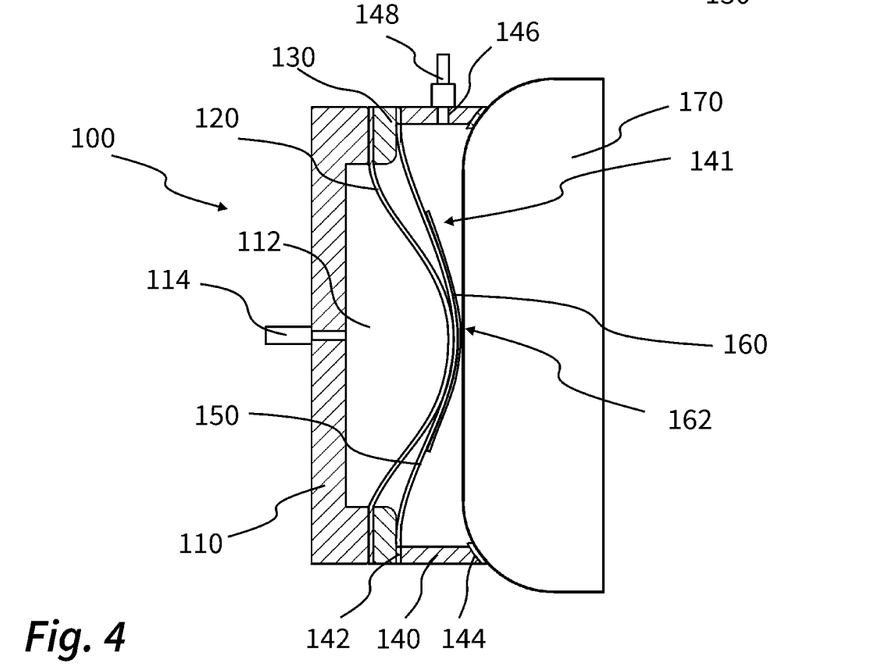
FIG. 4 schematically shows a partial illustration of a section through the tool illustrated in FIG. 3.

The mode of operation of the tool 100 and the principle of my method are explained with reference to FIGS. 3 and 4. In the figures, the membrane 120 is curved; its convex side can press the mounting film 150 and in particular the adhesive film 160 adhering thereto against the surface 170. When the negative-pressure chamber 141 is not closed (as illustrated in FIG. 3), the curvature can only be brought about by a positive pressure in the chamber 112. When the negative-pressure chamber 141 is closed (as illustrated in FIG. 4), a negative pressure can pull the membrane 120 into the chamber. The valve 114 must be opened for this.

As a result of the curvature of the membrane 120, the mounting film 150 with the adhesive film 160 is pressed onto the surface 170. A first contact region 162 is generally formed between adhesive film 160 and surface 170 and spreads out radially as the curvature of the membrane 120 intensifies. Residual air, which is possibly still located between the adhesive film 160 and the surface 170, can thus always escape outwardly on the shortest path. With the use of four separate adhesive films 160 in the form of letters, a first contact region may also exist between the mounting film 150 and the surface 170. Contact between the adhesive films 160 and surface 170 is in that example only established with the radial spreading-out of the contact region as the curvature of the membrane 120 intensifies.

The negative pressure in the negative-pressure chamber 141 has the advantage that the surface 170 is stabilized and can withstand the pressure exerted by the membrane 120, the force of which is aligned opposite to the negative pressure. This is a great advantage, especially when providing adhesive for components having thin wall thicknesses or in large surface areas.

After pressing the adhesive film 160 onto the surface 170 has been concluded, the negative-pressure chamber 141 and the pressure equalizing chamber 112 can be ventilated. The membrane 120 can then return to the initial state again. In this example, the mounting film 150 is generally pulled off from the adhesive films 160. The adhesive films 160 remain on the surface 170.

Figure 5:
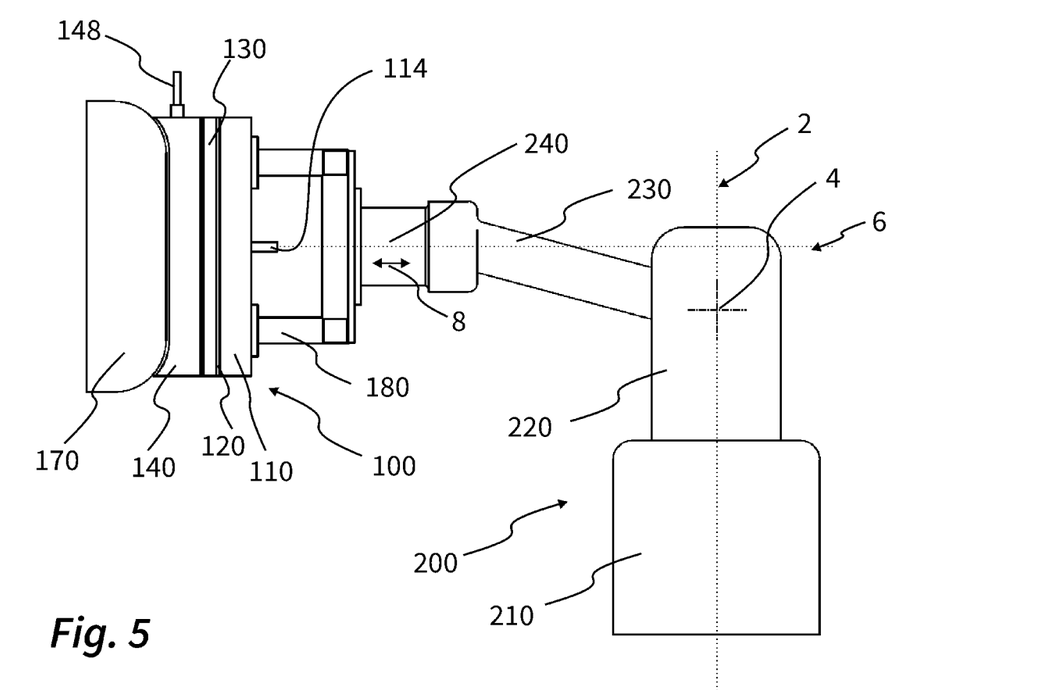
FIG. 5 schematically shows one example of a tool fastened to an arm of an automated system.

FIG. 5 shows an example in which the tool 100 is coupled to an arm 230 of an automated system 200 via the substructure 180. The automatic system 200 has a base 210 with a pivotable top part 220. The top part 220 can rotate freely about an axis of rotation 2. The robot arm 230 can be pivoted about a pivot axis 4. This allows the height of the tool 100 to be adjusted.

A hydraulic cylinder 240 is arranged between the robot arm 230 and the tool 100. The hydraulic cylinder 240 can be expanded linearly in a displacement direction 8. In addition, the hydraulic cylinder 240 can be rotated about an axis of rotation 6. Thus, a precise distance and alignment between the tool 100 and the surface 170 can be set.

Figure 6:
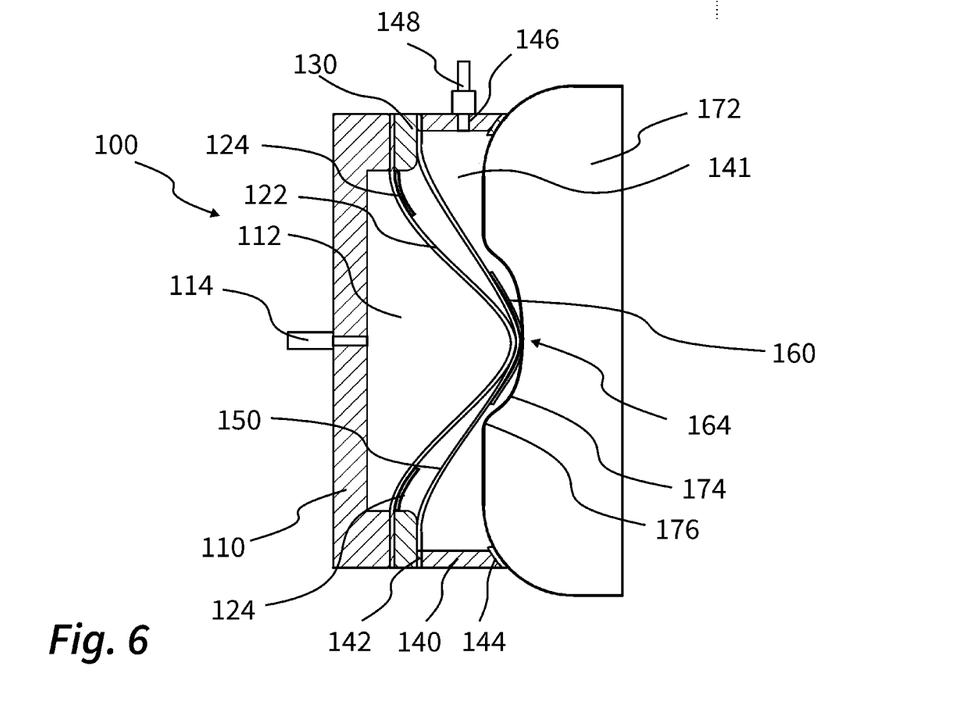
FIG. 6 schematically shows a section through one example of the tool that has a modified membrane.

FIG. 6 shows an alternative example of the tool 100 in which a modified membrane 122 is used. Otherwise, the structure of the tool corresponds to that of the tool illustrated in FIGS. 1 to 4. The modified membrane 122 comprises local reinforcements 124, as a result of which the membrane 122 initially curves to a greater extent in a central region than at its edges. This results in a more acute curvature of the membrane 122 and thus in a smaller first contact region 164. As a result, it is also possible for a surface 172 having an indentation 174 to be provided with adhesive by way of the adhesive film 160. The more acute curvature makes it possible for the first contact region 164 to be defined at the deepest point of the indentation 174 of the surface 172. This prevents the adhesive film 160 from first making contact with the surface 172 at the edges 176 of the indentation 174.

The invention claimed is:

1. A method of producing motor vehicles comprising:
 a. coating a motor vehicle body with at least one paint,
 b. drying and/or hardening the at least one paint,
 c. mounting attachment parts on load-bearing components of the motor vehicle body that has been coated with the at least one paint that has been dried and/or hardened, and
 d. applying an adhesive film comprising an adhesive layer to a surface of the motor vehicle body that has been coated with the at least one paint that has been dried and/or hardened or at least one attachment part mounted thereon,
 wherein, to apply the adhesive film,
 e. the adhesive film is positioned between the surface and an elastic membrane with an automated system, and
 f. the elastic membrane is transformed at least in selected regions into a curved state with a convex and a concave side and is brought into contact with the surface with the convex side in front such that the adhesive layer of the adhesive film is pressed onto the surface by the membrane over an entire surface area of the adhesive layer, and a negative pressure is applied in a region between the surface and the membrane by using a frame that forms, together with the surface to be provided with the adhesive film and the membrane, a negative-pressure chamber in which the adhesive film is arranged and into which the membrane can curve when the negative-pressure chamber is subjected to a negative pressure, wherein the negative pressure is varied depending on the pressure that the membrane exerts via the adhesive film on the surface to be provided with adhesive.

2. The method as claimed in claim 1, further comprising:
 a. transforming the elastic membrane at least in selected regions into the curved state with the convex and the concave side, and
 b. with the automated system bringing the membrane up to the surface with the convex side in front until the adhesive layer of the adhesive film is pressed onto the surface by the membrane over the entire surface area of the adhesive layer.

3. The method as claimed in claim 1, further comprising:
 a. bringing the elastic membrane up to the surface in one step with the automated system, and
 b. transforming the membrane at least in selected regions into a curved state with a convex and a concave side, and
 c. intensifying a curvature of the membrane until the adhesive layer of the adhesive film is pressed onto the surface over the entire surface area of the adhesive layer by the convex side of the membrane.

4. The method as claimed in claim 1, wherein the adhesive film comprises a carrier film having the adhesive layer on one side and a paint layer on the other side, and at least one of:
 a. the carrier film is a plastic film, a metal film or a metal/plastic composite film,
 b. the carrier film has a thickness of 10 µm to 120 µm,
 c. the adhesive layer has a thickness of 10 µm to 80 µm,
 d. the adhesive layer has a uniform thickness,
 e. the adhesive layer consists of a homogeneous adhesive mass,
 f. the adhesive layer has a surface area of 10 cm$^2$ to 8 m$^2$, and
 g. the paint layer has a thickness of 20 µm to 150 µm.

5. The method as claimed in claim 1, wherein at least one of:
 a. the negative pressure is set to a value of ≤ 750 mbar, and
 b. the membrane is transformed into the curved state by the negative pressure.

6. The method as claimed in claim 5, wherein at least one of:
 a. in a first step, the elastic membrane is brought up to the surface by the automated system,
 b. in a second step, the negative pressure is applied in the region between the surface to be provided with the adhesive film and the membrane,
 c. in a third step, the membrane is transformed into the curved state with the convex and concave sides by the applied negative pressure, and
 d. a curvature of the membrane is intensified by the negative pressure until the adhesive layer of the adhesive film is pressed onto the surface over the entire surface area of the adhesive layer by the convex side of the membrane.

7. The method as claimed in claim 5, wherein if the pressure exerted by the membrane on the surface to be provided with the adhesive film increases, the negative pressure is increased.

8. The method as claimed in claim 1, wherein at least one of:
 a. the membrane consists of an elastic polymer material,
 b. the membrane has a uniform thickness, and
 c. the membrane has weakening and/or reinforcing regions for targeted influencing of the geometry of the curved state.

9. The method as claimed in claim 1, wherein at least one of:
 a. the membrane is transformed into the curved state by a positive pressure, and
 b. the membrane is heated or cooled before the adhesive film is pressed on.

10. The method as claimed in claim 1, wherein at least one of:
 the adhesive film is positioned between the surface and the elastic membrane by a mounting film to which the adhesive film adheres with its side that faces away from the adhesive layer, and at least one of:
  a. to position the adhesive film, the mounting film is fixed on or in a frame, and
  b. after the adhesive film has been pressed onto the surface, the mounting film is pulled off from the adhesive film.

* * * * *